(12) United States Patent
Saxon et al.

(10) Patent No.: US 12,315,393 B2
(45) Date of Patent: May 27, 2025

(54) CLOUD BASED TEST ENVIRONMENT

(71) Applicant: Kryterion, Inc., Phoenix, AZ (US)

(72) Inventors: Steve Saxon, Scottsdale, AZ (US); Joel Neubeck, Cave Creek, AZ (US); Michael Collins, Surprise, AZ (US); Dan Weinmann, Phoenix, AZ (US); William Dorman, Phoenix, AZ (US)

(73) Assignee: Kryterion, Inc., Phoenix, AZ (US)

( * ) Notice: Subject to any disclaimer, the term of this patent is extended or adjusted under 35 U.S.C. 154(b) by 0 days.

(21) Appl. No.: 16/890,888

(22) Filed: Jun. 2, 2020

(65) Prior Publication Data
US 2020/0410886 A1    Dec. 31, 2020

Related U.S. Application Data

(63) Continuation of application No. 12/899,085, filed on Oct. 6, 2010, now Pat. No. 10,672,286, which is a
(Continued)

(51) Int. Cl.
*G09B 7/02* (2006.01)
*G06F 9/50* (2006.01)
(Continued)

(52) U.S. Cl.
CPC ........... *G09B 7/02* (2013.01); *G06F 9/50* (2013.01); *G06F 9/5027* (2013.01); *G09B 5/00* (2013.01);
(Continued)

(58) Field of Classification Search
CPC ... G09B 7/00; G09B 5/00; G09B 7/02; G06Q 50/20; G06Q 10/0631; G06Q 10/06;
(Continued)

(56) References Cited

U.S. PATENT DOCUMENTS 4,458,315 A   7/1984   Uchenick
4,951,249 A   8/1990   McClung et al.
(Continued)

FOREIGN PATENT DOCUMENTS

CN   1949186   4/2007
CN   101 626 376   1/2010
(Continued)

OTHER PUBLICATIONS

David Arnow et al., "On-line Programming Examinations Using WebToTeach," ITiCSE '99 Jun. 1999, Cracow, Poland, pp. 21-24.
(Continued)

*Primary Examiner* — Jack Yip
(74) *Attorney, Agent, or Firm* — Polsinelli LLP

(57) ABSTRACT

Systems and methods described herein provide for administering and proctoring of a secure online examination utilizing a 'cloud' computing environment. The cloud computing environment provides scalable, shared computing resources such as processing, memory, communications, storage and other hardware and software resources associated with the online examination. The computing resources provided by the cloud computing environment can be provisioned dynamically to match the requirements of the particular computing tasks carried out at the client and/or server level during the administration of the examination.

23 Claims, 7 Drawing Sheets

Related U.S. Application Data continuation-in-part of application No. 12/723,663, filed on Mar. 14, 2010, now abandoned.

(51) Int. Cl.

| | | |
|---|---|---|
| *G09B 5/00* | (2006.01) | |
| *G09B 7/00* | (2006.01) | |
| *G06F 21/31* | (2013.01) | |
| *G06Q 10/06* | (2023.01) | |
| *G06Q 10/0631* | (2023.01) | |
| *G06Q 50/20* | (2012.01) | |

(52) U.S. Cl.
CPC ............... *G09B 7/00* (2013.01); *G06F 9/505* (2013.01); *G06F 9/5072* (2013.01); *G06F 21/316* (2013.01); *G06Q 10/06* (2013.01); *G06Q 10/0631* (2013.01); *G06Q 50/20* (2013.01)

(58) Field of Classification Search
CPC ...... G06F 21/316; G06F 9/505; G06F 9/5072; G06F 9/50; G06F 9/5027
USPC ............................................. 434/362
See application file for complete search history.

(56) References Cited

U.S. PATENT DOCUMENTS

| | | | |
|---|---|---|---|
| 5,204,813 A | 4/1993 | Samph et al. | |
| 5,211,564 A | 5/1993 | Martinez et al. | |
| 5,361,359 A | 11/1994 | Tajalli et al. | |
| 5,412,717 A | 5/1995 | Fischer | |
| 5,635,940 A | 6/1997 | Hickman et al. | |
| 5,743,743 A | 4/1998 | Ho et al. | |
| 5,809,230 A | 9/1998 | Pereira | |
| 5,815,252 A | 9/1998 | Price-Francis | |
| 5,867,646 A | 2/1999 | Benson et al. | |
| 5,915,973 A | 6/1999 | Hoehn-Sarci et al. | |
| 5,919,257 A | 7/1999 | Trostle | |
| 5,987,611 A | 11/1999 | Freund | |
| 6,021,438 A | 2/2000 | Duvvoori et al. | |
| 6,112,049 A | 8/2000 | Sonnenfield | |
| 6,185,619 B1 | 2/2001 | Joffe et al. | |
| 6,266,773 B1 | 7/2001 | Kisor et al. | |
| 6,281,894 B1 | 8/2001 | Rive | |
| 6,282,404 B1 | 8/2001 | Linton | |
| 6,282,573 B1 | 8/2001 | Darago et al. | |
| 6,338,149 B1 | 1/2002 | Ciccone, Jr. et al. | |
| 6,418,298 B1 | 7/2002 | Sonnenfield | |
| 6,427,063 B1 | 7/2002 | Cook et al. | |
| 6,453,398 B1 | 9/2002 | McKenzie | |
| 6,523,119 B2 | 2/2003 | Pavlin et al. | |
| 6,694,434 B1 | 2/2004 | McGee et al. | |
| 6,766,458 B1 | 7/2004 | Harris | |
| 6,948,153 B2 | 9/2005 | Bowers | |
| 6,954,456 B2 | 10/2005 | Cranor et al. | |
| 6,966,048 B2 | 11/2005 | Bowers | |
| 6,978,115 B2 | 12/2005 | Whitehurst | |
| 7,069,586 B1 | 6/2006 | Winneg et al. | |
| 7,080,303 B2 | 7/2006 | Bowers | |
| 7,165,269 B2 | 1/2007 | Winneg et al. | |
| 7,194,664 B1 | 3/2007 | Fung | |
| 7,293,281 B1 | 11/2007 | Moran et al. | |
| 7,318,727 B2 | 1/2008 | Bowers | |
| 7,494,340 B2 | 2/2009 | Bowers et al. | |
| 7,725,737 B2 | 5/2010 | Konanka et al. | |
| 7,886,029 B2 | 2/2011 | Rogers et al. | |
| 8,271,077 B1* | 9/2012 | Rotenberg | A61B 5/375 600/545 |
| 8,489,635 B1 | 7/2013 | Phoha et al. | |
| 8,713,130 B2 | 4/2014 | Logan | |
| 9,092,991 B2 | 7/2015 | Logan | |
| 9,137,163 B2 | 9/2015 | Perryman | |
| 9,141,513 B2 | 9/2015 | Foster | |
| 9,280,907 B2 | 3/2016 | Dorman | |
| 9,378,648 B2 | 6/2016 | Logan | |
| 9,430,951 B2 | 8/2016 | Foster | |
| 9,716,748 B2 | 7/2017 | Perryman | |
| 9,984,582 B2 | 5/2018 | Logan | |
| 10,225,336 B2 | 3/2019 | Perryman | |
| 10,672,286 B2 | 6/2020 | Saxon | |
| 2002/0056010 A1 | 5/2002 | Lincoln et al. | |
| 2002/0078139 A1 | 6/2002 | Dutta | |
| 2002/0111173 A1 | 8/2002 | Hendrey et al. | |
| 2002/0172931 A1 | 11/2002 | Greene et al. | |
| 2003/0140111 A1 | 7/2003 | Pace et al. | |
| 2003/0149755 A1 | 8/2003 | Sadot | |
| 2003/0158928 A1 | 8/2003 | Knox et al. | |
| 2003/0195984 A1 | 10/2003 | Zisapel et al. | |
| 2004/0010544 A1 | 1/2004 | Slater et al. | |
| 2004/0010720 A1 | 1/2004 | Singh et al. | |
| 2004/0080504 A1 | 4/2004 | Salesky et al. | |
| 2004/0172466 A1 | 9/2004 | Douglas et al. | |
| 2004/0175047 A1 | 9/2004 | Gormish et al. | |
| 2004/0229199 A1 | 11/2004 | Ashley et al. | |
| 2004/0230488 A1 | 11/2004 | Beenau et al. | |
| 2004/0236843 A1 | 11/2004 | Wing | |
| 2005/0086498 A1 | 4/2005 | Hulik | |
| 2005/0240935 A1 | 10/2005 | Ramanathan | |
| 2005/0278439 A1* | 12/2005 | Cherkasova | H04L 67/1017 709/223 |
| 2006/0080656 A1 | 4/2006 | Cain et al. | |
| 2006/0085528 A1 | 4/2006 | Thomas | |
| 2006/0174320 A1 | 8/2006 | Maru et al. | |
| 2006/0174338 A1 | 8/2006 | Winneg et al. | |
| 2006/0206940 A1 | 9/2006 | Straus et al. | |
| 2006/0227810 A1* | 10/2006 | Childress | G06F 9/5011 370/477 |
| 2006/0280339 A1 | 12/2006 | Cho | |
| 2006/0286537 A1 | 12/2006 | Mandella et al. | |
| 2007/0016777 A1 | 1/2007 | Henderson | |
| 2007/0033588 A1 | 2/2007 | Landsman | |
| 2007/0048723 A1* | 3/2007 | Brewer | G09B 7/02 434/350 |
| 2007/0117082 A1 | 5/2007 | Winneg et al. | |
| 2007/0117083 A1 | 5/2007 | Winneg et al. | |
| 2007/0162894 A1 | 7/2007 | Noller | |
| 2008/0049777 A1 | 2/2008 | Morrill et al. | |
| 2008/0133964 A1 | 6/2008 | Rogers | |
| 2008/0240578 A1 | 10/2008 | Gudmundson et al. | |
| 2008/0318199 A1 | 12/2008 | Crouch | |
| 2009/0025005 A1* | 1/2009 | Holzapfel | G06Q 10/109 718/104 |
| 2009/0035740 A1 | 2/2009 | Reed et al. | |
| 2009/0196486 A1 | 8/2009 | Distante et al. | |
| 2009/0222552 A1 | 9/2009 | Chroscielewski et al. | |
| 2009/0222907 A1 | 9/2009 | Guichard | |
| 2010/0055659 A1 | 3/2010 | Rogers et al. | |
| 2010/0095015 A1 | 4/2010 | Zuckerman et al. | |
| 2010/0226532 A1 | 9/2010 | Hayasaka et al. | |
| 2011/0145392 A1 | 6/2011 | Dawson et al. | |
| 2011/0177484 A1 | 7/2011 | Morgan et al. | |
| 2011/0179491 A1 | 7/2011 | Spurlock et al. | |
| 2011/0207108 A1 | 8/2011 | Dorman | |
| 2011/0223576 A1 | 9/2011 | Foster | |
| 2011/0225017 A1* | 9/2011 | Radhakrishnan | G06Q 10/06315 705/7.25 |
| 2011/0244440 A1 | 10/2011 | Saxon | |
| 2011/0279228 A1 | 11/2011 | Kumar | |
| 2012/0034584 A1 | 2/2012 | Logan | |
| 2012/0036215 A1 | 2/2012 | Perryman | |
| 2012/0066679 A1* | 3/2012 | Pappas | G06F 9/45558 718/1 |
| 2012/0077176 A1 | 3/2012 | Foster | |
| 2012/0077177 A1 | 3/2012 | Foster | |
| 2012/0135388 A1 | 5/2012 | Foster | |
| 2012/0162384 A1 | 6/2012 | Vesely et al. | |
| 2012/0176220 A1 | 7/2012 | Garcia | |
| 2012/0183181 A1 | 7/2012 | You | |
| 2013/0130221 A1* | 5/2013 | Kortemeyer | G09B 5/12 434/362 |

(56) References Cited

U.S. PATENT DOCUMENTS

| | | |
|---|---|---|
| 2013/0307766 A1 | 11/2013 | Amathnadu et al. |
| 2014/0162228 A1 | 6/2014 | Logan |
| 2014/0212865 A1 | 7/2014 | Morgan et al. |
| 2014/0240507 A1 | 8/2014 | Hsu et al. |
| 2014/0272882 A1 | 9/2014 | Kaufman et al. |
| 2015/0077259 A1 | 3/2015 | Kumar et al. |
| 2015/0339935 A1 | 11/2015 | Logan |
| 2016/0012743 A1 | 1/2016 | Foster |
| 2016/0112505 A1 | 4/2016 | Perryman |
| 2016/0307451 A1 | 10/2016 | Logan |
| 2016/0307455 A1 | 10/2016 | Dorman |
| 2016/0335906 A1 | 11/2016 | Foster |
| 2017/0193833 A1 | 7/2017 | Morgan et al. |
| 2018/0048703 A1 | 2/2018 | Perryman |

FOREIGN PATENT DOCUMENTS

| | | |
|---|---|---|
| CN | 102696019 A | 9/2012 |
| EP | 1 017 204 | 7/2000 |
| EP | 2 483 781 | 8/2012 |
| EP | 2 630 582 | 8/2013 |
| EP | 2 630 583 | 8/2013 |
| WO | WO 99/36848 | 7/1999 |
| WO | WO 2011/041707 | 4/2011 |
| WO | WO 2011/115644 | 9/2011 |
| WO | WO 2012/018411 | 2/2012 |
| WO | WO 2012/018412 | 2/2012 |
| WO | WO 2014/159785 | 10/2014 |

OTHER PUBLICATIONS

Frank, Ariel J.; "Dependable distributed testing: Can the online proctor be reliably computerized?", E-Business (ICE-B), Proceedings of The 2010 International Conference on, IEEE, Jul. 26, 2010, pp. 1-10.
R. Sekar et al., "Synthesizing Fast Intrusion Prevention/Detection Systems From High-level Specifications," Proceedings of the 8th USENIX Security Symposium, Washington, D.C., Aug. 23-26, 1999, 17 pages.
Viola, Paul and Jones, Michael J.; "Rapid Object Detection using a Boosted Cascade of Simple Features, IEEE CVPR (2001)" (Viola et al.).
PCT Application No. PCT/US2010/051169, International Search Report and Written Opinion mailed Nov. 26, 2010.
PCT Application No. PCT/US2010/051811, International Search Report and Written Opinion mailed Nov. 29, 2010.
PCT Application No. PCT/US2011/25533, International Search Report and Written Opinion mailed Apr. 19, 2011.
PCT Application No. PCT/US2011/25545, International Search Report and Written Opinion mailed Apr. 27, 2011.
PCT Application No. PCT/US2014/025131, International Search Report and Written Opinion mailed Jul. 11, 2014.
Chinese Application No. 201080050561.2, Third Office Action dated Mar. 30, 2015.
Chinese Application No. 201080050561.2, Second Office Action dated Oct. 23, 2014.
Chinese Application No. 201080050561.2, Office Action dated Mar. 31, 2014.
European Application No. 10821352.1, Office Action dated May 30, 2012.
European Application No. 10821352.1 First Examination Report dated Aug. 24, 2017.
European Application No. 11814924.4 First Examination Report dated Oct. 5, 2017.
European Application No. 11814923.6 Extended European Search Report dated Nov. 22, 2017.
European Application No. 11814924.4 Second Extended European Search Report dated Oct. 16, 2019.
European Application No. 11814924.4 Extended European Search Report dated Feb. 1, 2016.
U.S. Appl. No. 12/571,666, Office Action mailed Mar. 31, 2015.
U.S. Appl. No. 12/571,666, Final Office Action mailed Feb. 28, 2014.
U.S. Appl. No. 12/571,666, Office Action mailed Jan. 29, 2014.
U.S. Appl. No. 12/571,666, Final Office Action mailed Oct. 23, 2012.
U.S. Appl. No. 12/571,666, Office Action mailed Jun. 12, 2012.
U.S. Appl. No. 14/860,526, Office Action mailed Dec. 30, 2015.
U.S. Appl. No. 15/218,448, Office Action mailed Dec. 13, 2019.
U.S. Appl. No. 15/218,448, Final Office Action mailed Jan. 31, 2019.
U.S. Appl. No. 15/218,448, Office Action mailed Sep. 12, 2018.
U.S. Appl. No. 12/850,136, Office Action mailed Jan. 27, 2015.
U.S. Appl. No. 12/850,136, Final Office Action mailed Oct. 31, 2013.
U.S. Appl. No. 12/850,136, Office Action mailed Apr. 15, 2013.
U.S. Appl. No. 12/850,136, Final Office Action mailed Sep. 12, 2012.
U.S. Appl. No. 12/850,136, Office Action mailed Mar. 9, 2012.
U.S. Appl. No. 14/855,216, Office Action mailed Oct. 21, 2016.
U.S. Appl. No. 15/659,368, Office Action mailed Feb. 27, 2018.
U.S. Appl. No. 12/723,663, Office Action mailed Oct. 20, 2016.
U.S. Appl. No. 12/723,663, Office Action mailed Sep. 15, 2015.
U.S. Appl. No. 12/723,663, Final Office Action mailed Jan. 30, 2015.
U.S. Appl. No. 12/723,663, Office Action mailed Oct. 7, 2014.
U.S. Appl. No. 12/723,663, Final Office Action mailed Jun. 16, 2014.
U.S. Appl. No. 12/723,663, Office Action mailed Dec. 18, 2013.
U.S. Appl. No. 12/723,663, Final Office Action mailed Oct. 8, 2013.
U.S. Appl. No. 12/723,663, Office Action mailed Jul. 17, 2013.
U.S. Appl. No. 12/723,663, Final Office Action mailed Apr. 5, 2013.
U.S. Appl. No. 12/723,663, Office Action mailed Dec. 6, 2012.
U.S. Appl. No. 12/723,663, Final Office Action mailed Aug. 16, 2012.
U.S. Appl. No. 12/723,663, Office Action mailed Feb. 15, 2012.
U.S. Appl. No. 12/723,667, Office Action mailed Aug. 24, 2016.
U.S. Appl. No. 12/723,667, Final Office Action mailed Oct. 23, 2015.
U.S. Appl. No. 12/723,667, Office Action mailed Jan. 14, 2015.
U.S. Appl. No. 12/723,667, Office Action mailed Jun. 2, 2014.
U.S. Appl. No. 12/723,667, Final Office Action mailed Dec. 23, 2013.
U.S. Appl. No. 12/723,667, Office Action mailed Oct. 3, 2013.
U.S. Appl. No. 12/723,667, Final Office Action mailed Apr. 10, 2013.
U.S. Appl. No. 12/723,667, Office Action mailed Dec. 6, 2012.
U.S. Appl. No. 12/723,667, Final Office Action mailed Aug. 16, 2012.
U.S. Appl. No. 12/723,667, Office Action mailed Feb. 15, 2012.
U.S. Appl. No. 12/723,666, Office Action mailed Aug. 10, 2017.
U.S. Appl. No. 12/723,666, Office Action mailed Jun. 20, 2016.
U.S. Appl. No. 12/723,666, Final Office Action mailed Apr. 9, 2015.
U.S. Appl. No. 12/723,666, Office Action mailed Jul. 18, 2014.
U.S. Appl. No. 12/723,666, Final Office Action mailed Dec. 18, 2013.
U.S. Appl. No. 12/723,666, Office Action mailed Jun. 19, 2013.
U.S. Appl. No. 12/723,666, Final Office Action mailed Apr. 5, 2013.
U.S. Appl. No. 12/723,666, Office Action mailed Dec. 6, 2012.
U.S. Appl. No. 12/723,666, Final Office Action mailed Aug. 1, 2012.
U.S. Appl. No. 12/723,666, Office Action mailed Mar. 29, 2012.
U.S. Appl. No. 14/207,637, Final Office Action mailed Apr. 24, 2019.
U.S. Appl. No. 14/207,637, Office Action mailed Dec. 3, 2018.
U.S. Appl. No. 14/207,637, Final Office Action mailed May 14, 2018.
U.S. Appl. No. 14/207,637, Office Action mailed Dec. 1, 2017.
U.S. Appl. No. 14/207,637, Final Office Action mailed Jan. 23, 2017.
U.S. Appl. No. 14/207,637, Office Action mailed Aug. 30, 2016.
U.S. Appl. No. 14/207,637, Final Office Action mailed Mar. 21, 2016.

(56) References Cited

OTHER PUBLICATIONS

U.S. Appl. No. 14/207,637, Office Action mailed Nov. 10, 2015.
U.S. Appl. No. 14/207,637, Final Office Action mailed Oct. 17, 2014.
U.S. Appl. No. 14/207,637, Office Action mailed Jun. 23, 2014.
U.S. Appl. No. 12/913,694, Final Office Action mailed Aug. 29, 2013.
U.S. Appl. No. 12/913,694, Final Office Action mailed May 7, 2013.
U.S. Appl. No. 12/913,694, Office Action mailed Jan. 30, 2013.
U.S. Appl. No. 12/913,694, Office Action mailed Dec. 7, 2012.
U.S. Appl. No. 14/179,410, Office Action mailed Aug. 11, 2014.
U.S. Appl. No. 14/179,410, Final Office Action mailed Nov. 21, 2014.
U.S. Appl. No. 15/194,081, Office Action mailed Dec. 1, 2016.
U.S. Appl. No. 12/913,697, Office Action mailed May 4, 2015.
U.S. Appl. No. 12/913,697, Final Office Action mailed Apr. 14, 2014.
U.S. Appl. No. 12/913,697, Office Action mailed Jan. 3, 2014.
U.S. Appl. No. 15/064,570, Final Office Action mailed Jun. 8, 2020.
U.S. Appl. No. 15/064,570, Office Action mailed Dec. 19, 2019.
U.S. Appl. No. 15/064,570, Final Office Action mailed Apr. 8, 2019.
U.S. Appl. No. 15/064,570, Office Action mailed Dec. 31, 2018.
U.S. Appl. No. 15/064,570, Final Office Action mailed May 14, 2018.
U.S. Appl. No. 15/064,570, Office Action mailed Nov. 1, 2017.
U.S. Appl. No. 15/064,570, Final Office Action mailed Feb. 16, 2017.
U.S. Appl. No. 15/064,570, Office Action mailed Nov. 2, 2016.
U.S. Appl. No. 12/899,085, Office Action mailed May 29, 2019.
U.S. Appl. No. 12/899,085, Final Office Action mailed Mar. 22, 2018.
U.S. Appl. No. 12/899,085, Final Office Action mailed May 19, 2016.
U.S. Appl. No. 12/899,085, Office Action mailed Aug. 19, 2015.
U.S. Appl. No. 12/899,085, Final Office Action mailed Jan. 26, 2015.
U.S. Appl. No. 12/899,085, Office Action mailed Sep. 12, 2014.
U.S. Appl. No. 12/899,085, Final Office Action mailed Mar. 5, 2013.
U.S. Appl. No. 12/899,085, Office Action mailed Oct. 8, 2013.
U.S. Appl. No. 12/899,085, Office Action mailed Jul. 31, 2012.
U.S. Appl. No. 15/064,570, Office Action mailed Feb. 5, 2021.

* cited by examiner

CLOUD BASED TEST ENVIRONMENT

CROSS REFERENCE TO RELATED APPLICATIONS

The present application is a continuation and claims the priority benefit of U.S. patent application Ser. No. 12/899,085 filed Oct. 6, 2010, now U.S. Pat. No. 10,672,286, which is a continuation-in-part and claims the priority benefit of U.S. patent application Ser. No. 12/723,663, filed on Mar. 14, 2010, the disclosures of which are incorporated herein by reference.

BACKGROUND OF THE INVENTION

Field of the Invention

The present invention generally relates to online testing. More specifically, the present invention concerns administering and proctoring of a secure online test.

Description of Related Art

Tests are used to determine the ability of a test taker such as a student or prospective practitioner as it pertains to proficiency in a particular subject or skill set. For example, a student might take a test to determine whether the student possesses requisite knowledge in a particular subject that might be related to receiving a degree or certificate. A prospective practitioner of law or medicine similarly might sit for an examination to determine their competence as it pertains to practicing in that profession.

Students or prospective practitioners have historically gathered at the designated locale for an examination on a proscribed date and time. Testing materials are then handed out by a testing authority and the test begins. During the allotted time, the test takers read questions and provide answers on a provided answer sheet or in a 'blue book.' Throughout the course of examination, a teacher or proctor keeps careful watch over the test takers to ensure that no instances of cheating are taking place. While a single proctor may be able to observe a small group of test takers, such observation becomes more difficult for a larger test taking pool or for a group of test takers utilizing laptop computers or other computing devices.

The increased popularity of distance learning has also complicated proctoring of examinations. The distance learning instructional model delivers education material and information to students who are not physically 'on site' at an education facility. Distance learning provides access to learning opportunities when the source of the information and the student are separated by time or distance if not both. Thousands of distance learners may be involved in a particular distance learning program or course at any given time.

Distance learning is no different than any other educational program in that there is a need to verify the qualifications of students through testing and examination. Because distance learners are not collectively gathered at a physical learning institution such as a university, the distance learning program often requires that the students attend a testing center—which defeats a purpose of distance learning—or administers an examination online. An online examination is difficult to proctor as a user could be taking an examination in one window of a web browser while looking up answers in another window via the Internet. A test taker could also utilize a 'chat' or 'messaging' application to relay questions to and receive answers from a knowledgeable third-party. The value of online examinations is, therefore, questionable and calls into question the overall value of the corresponding class or degree program.

It can also be difficult to administer a secure online examination due to the various computationally-intensive tasks that may be executed at the client and/or the server level to ensure the integrity and accuracy of the online exam process. For example, real-time audio and/or video data streams of the testing environment surrounding a test taker may be provided over a network to a remote proctor who is responsible for remotely observing the administration of the exam. See, for example, commonly-owned U.S. patent application Ser. No. 12/723,666, the disclosure of which is incorporated herein by reference.

Uploading the data stream and subsequently providing it in real-time to a remote proctor is challenging for a number of reasons including high bit rates, delay, and loss sensitivity. Delays and disruptions in the data stream from the test taker's computing device to that of the remote proctor hamper the observation of the test taker during the administration of the exam, which may call into question the integrity of the exam process.

Similarly, delays in providing exam content such as the questions to a test taker interrupt the testing routine of the exam, which can frustrate or distract the test taker. In such a case, the test taker's focus on answering the questions themselves is diminished, which may render the exam inadequate for accurately evaluating the test taker's knowledge or skill level in a particular subject. Furthermore, in the case of a time-limited exam, these delays place the test taker at a distinct disadvantage compared to his peers.

In order to overcome or alleviate the problems associated with these delays and disruptions, a vast amount of computing resources may be utilized or reserved at the client and server levels. At the client level, the computational burden for such resources can prohibit the use of some types of client devices like portable devices such as mobile phones. As a result, a test taker may be required to utilize a relatively expensive computing device, which can limit the use of distance learning. In addition, due to the fluctuation in the number of test takers over time, the computing resources required at the server level can vary significantly. In order to ensure that sufficient resources are available to handle intermittent periods of peak demand, a large amount of resources may primarily be idle. Such an approach is inefficient and expensive.

There is a need in the art for administering a secure online exam which addresses the problems associated with these delays and disruptions, while also mitigating the need to perform a vast amount of data processing at the client level. There is a similar need for managing computing resources at the server level, such that intermittent periods of peak demand can be efficiently serviced.

SUMMARY OF THE CLAIMED INVENTION

Systems and methods described herein provide for administering and proctoring of a secure online examination utilizing a 'cloud' computing environment. The cloud computing environment provides scalable, shared computing resources such as processing, memory, communications, storage and other hardware and software resources associated with the online examination. The computing resources provided by the cloud computing environment can be provisioned dynamically to match the requirements of the particular computing tasks carried out at the client and/or server level during the administration of the examination.

The systems and methods described herein thus enable efficient and cost-effective use of computing resources while also servicing periods of peak demand. Provisioning the resources on a dynamic basis also allows for the real-time shifting of computing resources within the cloud, which reduces or eliminates delays and disruptions due to an application or hardware failure. In addition, locally installed software on a client device may be supplemented by or replaced with computing resources provided by the cloud computing environment. This mitigates the need to perform a vast amount of data processing at the client level, thereby providing flexibility in the types of client devices that may utilized by test takers and proctors.

A method described herein for administration of an examination over a network includes receiving a request over the network for desired computing resources of a cloud computer system having a plurality of resource servers. The request is received from a computing device executing a routine for the examination. The method also includes provisioning computing resources of one or more resource servers in the plurality of resource servers for use by the computing device based on the request. Examination data associated with the request is then received. An operation is then performed on the received examination data using the provisioned computing resources, and resulting data of the operation performed on the examination data is transmitted to the computing device.

A computer readable storage medium as described herein has embodied thereon a program, the program being executable by a processor to perform a method as described above for administration of an examination over a network.

DETAILED DESCRIPTION

Figure 1:
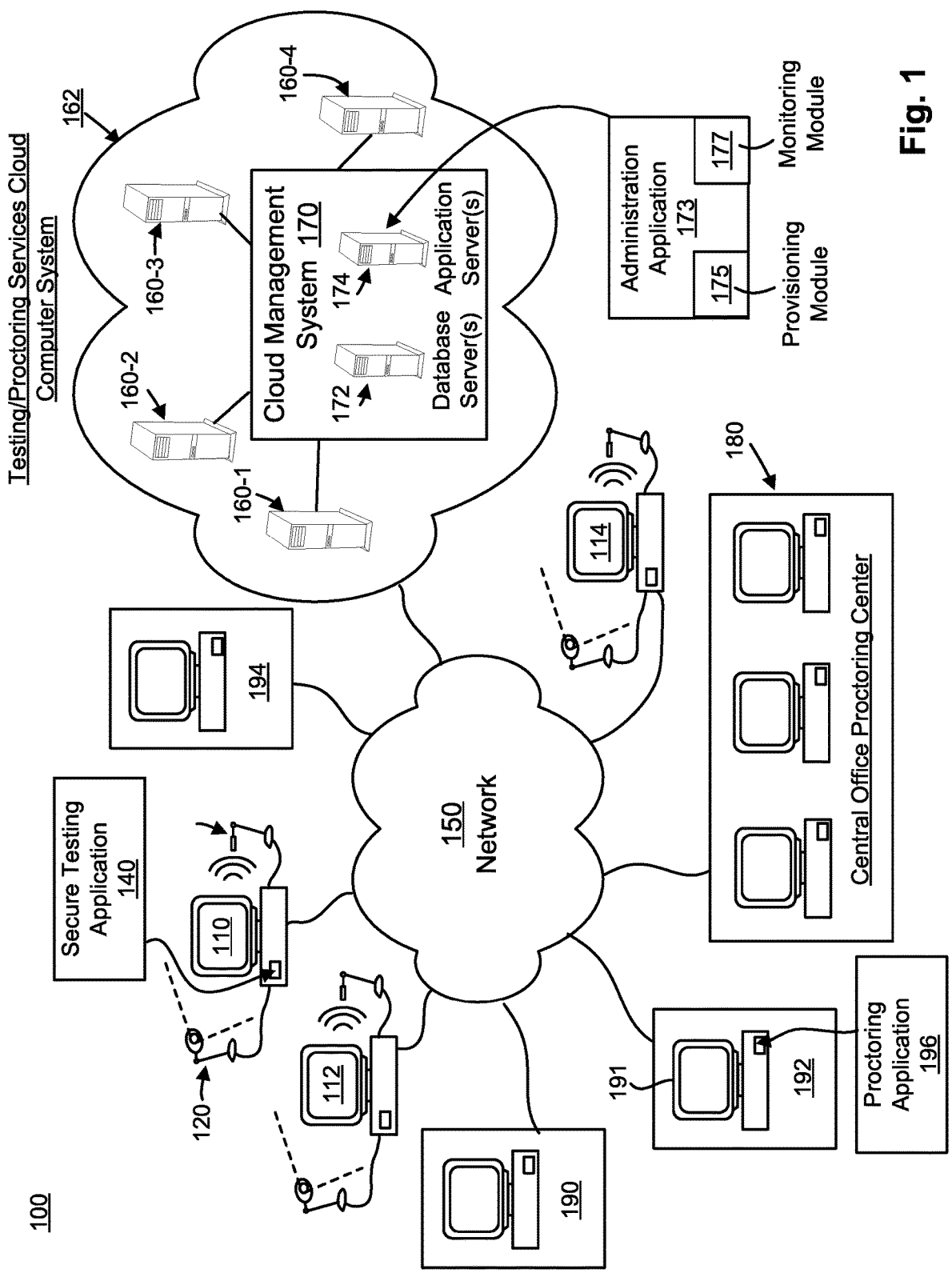
FIG. 1 illustrates a system for administering a secure online examination utilizing a cloud computer system.

Systems and methods described herein provide for administering and proctoring of a secure online examination utilizing a 'cloud' computing environment. The cloud computing environment provides scalable, shared computing resources such as processing, memory, communications, storage and other hardware and software resources associated with the online examination. The computing resources provided by the cloud computing environment can be provisioned dynamically to match the requirements of the particular computing tasks carried out at the client and/or server level during the administration of the examination.

The systems and methods described herein thus enable efficient and cost-effective use of computing resources while also servicing periods of peak demand. Provisioning the resources on a dynamic basis also allows for the real-time shifting of computing resources within the cloud, which reduces or eliminates delays and disruptions due to an application or hardware failure. Advantageously, this provides improved reliability in the delivery of exam content and other data associated with the online examination, without the client (e.g., a test taker or proctor) experiencing a degradation in computing performance. This also provides for real-time shifting and sharing of proctoring responsibilities, such that a small number of proctors can properly maintain the integrity of the testing environment, notwithstanding the large number of test takers.

In addition, locally installed software on a client device (e.g. the computing device of a proctor or test taker) may be supplemented by or replaced with computing resources provided by the cloud computing environment. This mitigates the need to perform a vast amount of data processing at the client level, thereby providing flexibility in the types of client devices that may utilized by test takers and proctors. In particular, this allows test takers and proctors to utilize computing devices providing greater comfort and affordability, without experiencing degradation in computing performance Securing a computing device of a test taker includes locking out or preventing access to any application or hardware not deemed necessary or appropriate by the exam administrator. Securing a computing device may further include allowing the exam administrator access to the computing device before or during the examination. By granting access to the computing device, the exam administrator may search for illicit files related to the examination or make determinations as to whether the test taker has attempted to disable (or has disabled) certain functionality as it relates to locking out unnecessary or inappropriate applications on the computing device. Securing the computing device may further include allowing for dynamic locking and unlocking of applications and/or an hardware pertaining to the online examination.

A video camera device or other visual and/or audio environment capture device may be used to generate data of the examination environment surrounding the test taker. A remote proctor may view the data in real time, and determine if any visual or audio activity in the examination environment constitutes activity not in accordance with the testing protocol.

FIG. 1 illustrates a system 100 system for administering a secure online examination utilizing a cloud computer system 162. The system 100 of FIG. 1 includes computing devices 110, 112, 114 that may be utilized by a user (test taker) to take an examination, cloud computer system 162 providing computing resources for administering an examination via a communications network 150, a central office proctoring center 180, and geographically distributed proctoring centers 190, 192, 194.

The computing devices 110, 112, 114 may be any sort of computing device as is known in the art. The computing devices 110, 112, 114 include memory for storage of data and software applications, a processor for accessing data and executing applications, and input and output devices that allow for user interaction. The computing devices 110, 112, 114 further include components that facilitate communication over the communications network 150 such as an RJ-45 connection for use in twisted pair based 10 baseT networks or a wireless network interface card allowing for connection to a radio-based communication network (e.g., an 802.11 wireless network).

The computing devices 110, 112, 114 may be a general purpose computing device such as a desktop or laptop computer. The computing devices 110, 112, 114 may belong to a particular user rather than being a computing device dedicated to exam taking as might be found in a examination center. Thin client or netbook client devices may be implemented in the context of computing devices as might mobile computing devices such as smart phones.

Communication network 150 may be a local, proprietary network (e.g., an intranet) and/or may be a part of a larger wide-area network. The communication network 150 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communication network 150 allows for communication between the various components of system 100.

The computing device 110 is representative of the computing devices 110, 112, 114. As described below, a secure testing application 140 executable by computing device 110 operates in conjunction with computing resources provided by the cloud computer system 162 to properly execute a routine for the examination. The routine may for example involve securing the computing device 110 in order to prevent access to files or other types of data such as notes, outlines, and exam preparation material during an examination, as well as preventing access to applications that themselves allow for access to data. As another example, the routine may involve verifying that a current user of the computing device is an authorized test taker of the examination. As yet another example, the routine may involve implementing the actual examination on the computing device 110. This can include providing testing data such as the prompts, questions, or other data concerning the exam, as well as analyzing answers to the questions provided by the test taker to determine the competence of the test taker.

The cloud computing system 162 is coupled to the communications network 150. The cloud computing system 162 includes a cloud management system 170 and a plurality of resource servers 160-1 to 160-4. In the system 100 illustrated in FIG. 1, four resource servers 160-1 to 160-4 are shown. Notwithstanding the six illustrated servers, the system 100 may include more or less resource servers. The cloud computing system 162 may be a 'private' cloud (e.g. access to the cloud computing system 162 may not be generally accessible to entities other than the exam administrator) or a 'public' cloud (e.g. access to the cloud computing system 162 may be accessible to other entities).

In the illustrated embodiment, the resources servers 160-1 to 160-4 of the cloud computing system 162 provide computing resources utilized both by test takers and by proctors. Alternatively, different cloud computing environments may be utilized by test takers and proctors.

The cloud management system 170 manages the real-time provisioning and utilization of computing resources of the resource servers 160-1 to 160-4 in response to requests from the computing devices 110, 112, 114, central office proctoring center 180, and geographically distributed proctoring centers 190, 192, 194. The cloud management system 170 includes an application server 174 and database server 172. The application server 174 and the database server 172 are each a computing device and include memory, a processor for accessing data and executing applications, and components to facilitate communication over communication network 150. The application server 174 includes an administration application 173 stored in memory and executed by a processor to invoke its corresponding functionality.

The administration application 173 is executable to handle requests for the use of computing resources of the resource servers 160-1 to 160-4 during administration of an exam. The administration application 173 provides an interface for the cloud computing system 162. As described below, these requests are analyzed by the administration application 173 to provision computing resources of one or more of the resource servers 160-1 to 160-4 based on the requests. The administration application 173 is also tasked with managing the exchange of data between the provisioned computing resources and the requesting device to perform a desired operation. This exchange of data may consist of moving the data associated with the request directly between the provisioned computing resources of the resource servers 160-1 to 160-4 and the requesting device, without requiring that data first enter the cloud management system 170. Alternatively, the administration application 173 may be tasked with receiving examination data associated with the request from the requesting device, providing the examination data to the provisioned computing resources to perform a desired operation, and transmitting resulting data of the desired operation back to the requesting device.

The administration application 173 in the illustrated embodiment includes a provisioning module 175 and a monitoring module 177. The provisioning module 175 is responsible for provisioning the computing resources of the resource servers 160-1 to 160-4 based on the requests. The monitoring module 177 is responsible for analyzing various performance metrics of the resource servers 160-1 to 160-4. These metrics may then be used by the provisioning module 175 to provision available computing resources in response to new requests.

The provisioning module 175 also uses the metrics provided by the monitoring module 177 to adjust (i.e., reassign) provisioned computing resources based on changes in the performance of the resource servers 160-1 to 160-4. Provisioning the computing resources in such a manner allows for the real-time shifting of computing resources within the cloud computer system 172, which can reduce or eliminates delay and disruption due to an application or hardware failure in the resource servers 160-1 to 160-4. In doing so, exam content and other data associated with the online examination can be provided to the test takers and proctors in a highly reliable manner. The administration application 173 is described in further detail below with respect to FIGS. 2 to 7.

The application server 174 also operates as an origin server for the exam content during the administration and proctoring of an examination. Alternatively, the exam content may be maintained by another computing device coupled to the network 150. The distribution of exam content to the provisioned computing resources may include on-demand or push-based mechanisms. The exam content includes testing data such as the actual exam (e.g., prompts, questions, etc.) or other data concerning the exam, as well as answers to questions provided by test takers.

The application server 174 also provisions computing resources to manage the real-time upload and distribution of data streams of the examination environments captured from visual and/or audio capture devices coupled to the computing devices 110, 112, 114. The visual and/or audio capture devices are used to monitor the exam taking environment surrounding the test taker during administration of the exam. The data stream may be transmitted in real-time to the central office proctoring center 180, and/or one or more geographically distributed proctoring centers 190, 192, 194. A proctor may then view the data stream via a streaming technique in real-time (i.e., during administration of the examination), and determine if any visual activity in the examination environment constitutes activity not in accordance with the testing protocol. The database server 172 may also store the data streams for retrieval and playback in a non-streaming fashion.

Registration identification information of the test takers, such as a name or examination identification number as well as a password, may also be stored in the database server 172. Biometric information such as a visual image of the test taker may also be stored in the database server 172 and compared against a previously stored and known 'good' image of the test taker. A similar comparison may be made with respect to a voice print. Retinal scans and finger prints, subject to the presence of the appropriate peripheral device, may also be stored and used for verifying test taker identity. These peripheral devices may be implemented in the context of the use of video camera device 120, microphone 130, or other environment capture device.

Each of the resource servers 160-1 to 160-4 is a computing device which includes memory, a processor for accessing data and executing applications, and components to facilitate communication over communications network 150. As mentioned above, the application server 174 manages the real-time provisioning and utilization of computing resources of the resource servers 160-1 to 160-4 in response to requests. The application server 174 analyzes to request to determine the details of the requested computing resources, such as processing power, memory, communications, storage and other hardware and software resources. Based on this analysis, the application server 174 provides configuration data to one or more of the resource servers 160-1 to 160-4 specifying the details of the computing resources to be provisioned. The configuration data is used to create a virtual instance of the provisioned computing resources in the form of a virtual server for use by the requesting device. Once the virtual server is formed, unique identification information of the virtual server (e.g., an IP address) is sent to the requesting device so that the requesting device may access the provisioned resources.

Central office proctoring center 180 is an operations center with computing devices staffed with one or more proctors observing the data streams of various examination environments for test takers at one or more examination sites. These examination sites may be physically remote from the central office proctoring center 180. Examination sites can be examination centers dedicated to the offering of examinations, traditional classroom settings, as well as personal space such as a home or office workspace. The geographically distributed proctoring centers 190, 192, 194 include computing devices which may belong to a particular proctor, rather than being a computing device dedicated to proctoring as might otherwise be found in the central office proctoring center 180. The proctors at the central office proctoring center 180 and geographically distributed proctoring centers 190, 192, 194 may observe and analyze a variety of different types of information to help ensure the integrity of the examination.

The computing devices 110, 112, 114 are secured for the taking of an exam through the installation and subsequent execution of a secure testing application (e.g., secure testing application 140 installed on computing device 110). Computing device 110 is representative of the computing devices 110, 112, 114. Secure testing application 140 may be downloaded from the application server 174 or another computing device coupled to the communication network 150. Secure testing application 140 may also be installed from a computer-readable storage device such as a CD-ROM. The secure testing application 140 may then be stored in memory at the corresponding computing device 110 and executed by a processor to invoke its corresponding functionality.

The secure testing application 140 operates in conjunction with computing resources provided by the cloud computer system 162 to secure the computing device 110 in order to prevent access to files or other types of data such as notes, outlines, and exam preparation material during an examination, as well as preventing access to applications that themselves allow for access to data.

Secure testing application 140 is a security application software that prevents computing device 110 from accessing certain data or applications that might otherwise be in violation of testing regulations or protocols as identified by application server 174. The security application software 140 causes the computing device 110 to operate in a secure mode by introducing certain changes to the system registry such that only those applications or files deemed necessary or appropriate by the test administrator and as embodied in a corresponding testing protocol may be allocated address space, loaded into memory and ultimately executed by the computing device 110.

For example, a testing protocol for a particular examination may deny access to a web browser, e-mail client, and chat applications such that a test taker may not electronically communicate with other individuals during the examination. This particular protocol may be downloaded to the computing device 110 from the provisioned computing resources along with testing data. The secure testing application 140 then operates in accordance with the downloaded testing protocol such that certain applications are not allowed to be loaded and executed. Because the applications that may be installed on a computing device are all but infinite, the testing protocol may identify those applications that a test taker is allowed to access rather than those applications to which access is prohibited.

Similar prohibitions or permissions may apply to hardware components of the computing device 110 as well as any number of hardware peripherals that might be introduced to the computing devices 110. Examples of such peripherals that might be introduced include a second computer monitor, docking stations, a traditional full-sized keyboard as might be used with a laptop computer. Other peripherals might include thumb drives, 'time-shift' recording devices that offer TiVo®-like functionality, as well as any number of other plug-and-play peripherals.

The secure testing application 140 also operates in conjunction with the provisioned computing resources by the cloud computer system 162 to properly execute a testing routine for the given examination event. For example, the testing routine may allow for the user to have access to all questions at any given time such that the user may answer and not answer questions at their leisure and subsequently return to any questions at a later time for further review. The testing routine may alternatively require the test taker to lock in an answer or set of answers and have the same reported to the application server 174 prior to receiving a subsequent question. In some instances, the testing data is maintained at the application server 174 and only displayed at the computing device 110 utilizing provisioned resources. In such an instance, the test data itself may never be stored or downloaded at the computing device 110.

In instances where the secure testing application 140 allows access to certain applications on computing device 110, the functionalities of those applications may be limited. For example, a testing protocol may allow for activation of a web browser and network connectivity, but only to a single secure site providing testing data. The protocol may further or alternatively allow for exchanges of only certain types of data or data that has been certified for exchange with provisioned computing resources of the cloud computing system 162. Such 'certifications' may include the presence of certain headers in the data or the data having been encrypted in a particular fashion. Similarly, the 'print' function of a particular application may be disabled. The testing protocol may include instructions on how certain application programming interfaces (APIs) for certain software applications are to be implemented or disabled by the secure testing application 140. Drivers may be managed in a similar fashion (e.g., a printer driver).

Access to certain applications, hardware, or functionality may be disabled or limited for a particular portion of an examination. The occurrence of certain milestones or events during a testing event may correspond to the enablement or disabling of hardware, software, or specific application functionality. For example, print functionality may be disabled during an examination to prevent a test taker from printing a copy of the examination and then delivering the copy to a friend so that they may review the questions before they take the examination. The functionality may be enabled, however, to allow the user to keep a copy of their answers sans the questions. The functionality may be re-enabled once a test taker clicks on a 'Test Complete' button or icon that locks in the test taker's answers and prevents them from being further manipulated once certain computing device 110 hardware, software or functionality has been re-enabled that was otherwise disabled during the examination.

The secure testing application 140 may also utilize provisioned computing resources of the cloud computing system 162 to observe activity on the computing device 110 during administration of an examination. If the test taker attempts to make changes to the system registry that were implemented by the secure testing application 140, the secure testing application 140 may identify and report these attempts to the central office monitoring center 180, and distributed proctor monitoring centers 190, 192, 194.

The secure testing application 140 may operate in conjunction with video camera device 120 or other visual and/or audio capture device to monitor the exam environment surrounding the test taker of the computing device 110. Video camera device 120, which may be a commercially available web camera or other image acquisition device, generates a real-time data stream of the exam environment. If the test taker leaves their seat or another individual enters the exam area during the course of the examination, the video camera device 120 will capture this visual information.

The video camera device 120 provides the data stream to the secure testing application 140. The secure testing application 140 encodes and uploads the captured data stream into the cloud computer system 162. The cloud management system 170 in turn provisions computing resources of the resource servers 160-1 to 160-4 to deliver the data stream to the central office monitoring center 180, and/or one or more geographically distributed proctor monitoring centers 190, 192, 194, during the administration of the examination.

A proctor at the central office monitoring center 180 and/or the proctor monitoring centers 190, 192, 194 may then view the data stream provided by the cloud computer system 162 and determine if any visual activity constitutes activity not in accordance with the testing protocol. The proctor may then log the information for further assessment by the actual exam administrator (e.g., the professor or professional association administrating the examination) or make a direct inquiry of the test taker as to the nature of the observed behavior, provide a warning as to terminate that behavior, or otherwise intervene in the testing routine to resolve the aberrant behavior.

The computing device 191 at the proctoring center 192 is representative of computing devices in the central office proctoring center 180 and geographically distributed proctoring centers 190, 192, 194. The computing device 191 may be any sort of computing device as is known in the art. The computing device 191 include memory for storage of data and software applications, a processor for accessing data and executing applications, and input and output devices that allow for user interaction. The computing device 191 further includes components that facilitate communication over the communications network 150.

The computing device 191 may be a general purpose computing device such as a desktop or laptop computer. Thin client or netbook client devices may be implemented in the context of computing device 191 as might mobile computing devices such as smart phones.

The computing device 191 includes a proctoring application 196 stored in memory and executed by a processor to invoke its corresponding functionality. The proctoring application 196 operates in conjunction with provisioned computing resources of the cloud computing system 162 to request, receive and display real-time data streams of the examination environment surrounding test takers. The proctoring application 196 is executable to request provisioned resources that transmit data streams to the computing device 191, as well as to request that the provisioned resources transmit data streams to other proctor's computing devices.

The proctoring application 196 may for example be a commercially available application such as a web browser, or any other software application which can be utilized for proctoring an online examination as described herein. The proctoring application 196 may alternatively be created by the testing administrator or otherwise developed specifically for proctoring of the online exam.

Similar to the discussion above with regards to the secure testing application 140, in some embodiments the proctoring application 196 may cause the computing device 191 to operate in a secure mode.

The proctor viewing the data stream may also request computing resources of the cloud computing system 162 utilized to temporarily or permanently transmit the data stream to another computing device, such as one or more of central office monitoring center 180 and the remote proctor monitoring centers 190, 192, 194. This allows for real-time sharing and shifting of responsibilities among the proctors and third party test assessment authorities. As a result, a small number of proctors and assessment authorities can properly maintain the integrity of the testing environment, notwithstanding the large number of test takers.

As an example, a proctor may be responsible for simultaneous observation of a number of data streams of the examination environments surrounding different test takers.

Upon detection of possible aberrant behavior by a particular test taker, the proctor may request that the data streams of the other test takers currently received also be transmitted to the computing device of one or more proctors. In doing so, the proctor can more closely analyze the possible aberrant behavior by the particular test taker, without allowing the remaining test takers to go unobserved. This request may be generated automatically based on user input to the viewing application 196, such as the selection by the proctor that the data stream be 'exploded' into a larger view.

As another example, a proctor may request that the data stream of a test taker exhibiting possible aberrant behavior be transmitted to the computing device of another proctor or third party test assessment authority (e.g., a professor) for the purpose of validating or making an affirmative determination that the test taker in fact violated a testing protocol. Following a determination that a test taker violated a testing protocol, the proctor or other third party test assessment authority can then make a final or early decision regarding disciplinary action.

Figure 2:
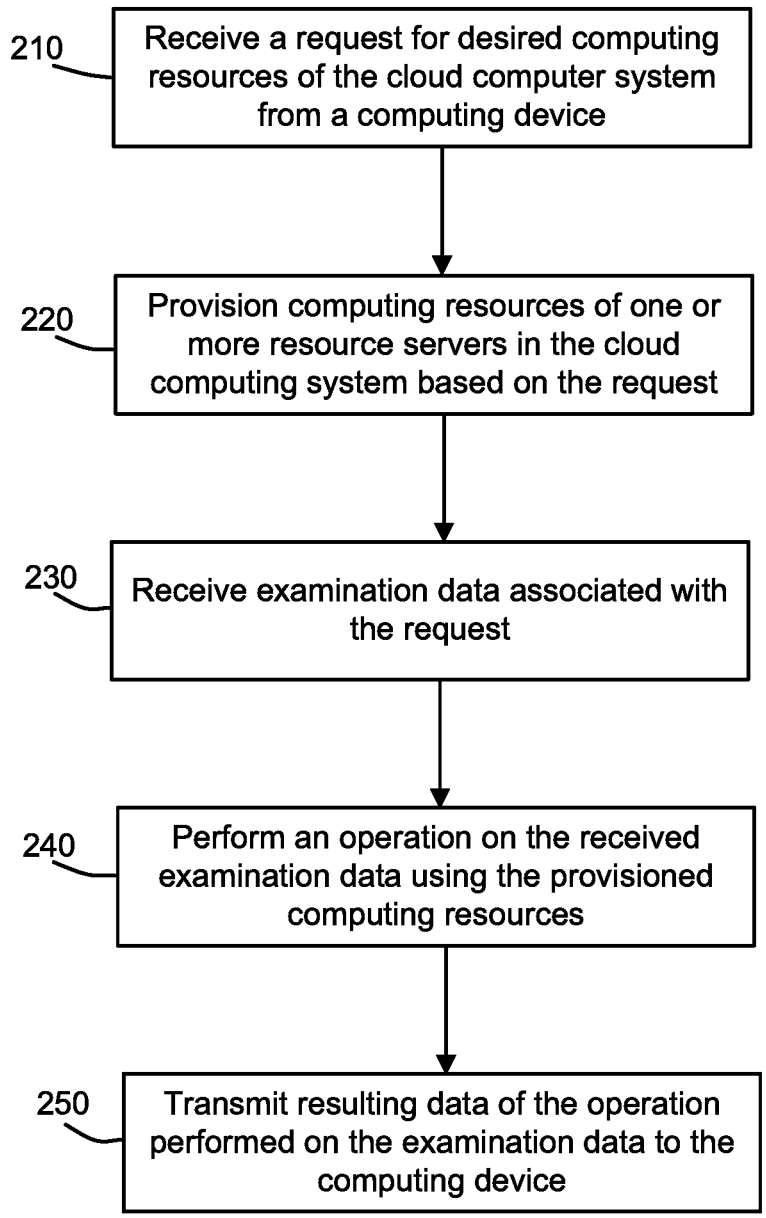
FIG. 2 illustrates a method for provisioning computing resources of the cloud computer system.

FIG. 2 illustrates a method 200 for provisioning computing resources of the cloud computer system 162. In step 210, the application server 174 receives a request for desired computing resources of the cloud computer system 162 from a computing device. In this example the request is received from the computing device 110 associated with a test taker. Alternatively, the request may be from a computing device associated with a proctor.

The request indicates the details of the requested computing resources, such as processing power, memory, communications, storage and other hardware and software resources for use by the computing device 110 to properly execute a routine for the examination. The transmission of the request for desired computing resources may be initiated automatically by the secure testing application 140 in response to the occurrence of certain milestones or events during the examination. Examples of routines for the examination which may request desired computing resources are described in further detail below with respect to FIGS. 3 to 7.

In step 220, the application server 174 provisions computing resources of one or more of the resource servers 160-1 to 160-4 based on the request. The application server 174 analyzes to request to determine the details of the requested computing resources, such as processing power, memory, communications, storage and other hardware and software resources. Based on this analysis, the application server 174 provides configuration data to one or more of the resource servers 160-1 to 160-4 specifying the details of the computing resources to be provisioned. The configuration data is used to create a virtual instance of the provisioned computing resources in the form of a virtual server for use by the computing device 110. Once the virtual server is formed, unique identification information of the virtual server (e.g., an IP address) is sent to the computing device 110 that can be used to facilitate communication between the computing device 110 and the provisioned computing resources.

At step 230, the cloud computer system 162 receives examination data associated with the request. The examination data is the data on which the provisioned computing resources perform an operation associated with the online examination. Examples of examination data and the operations which may be performed by the provisioned computing resources are described in further detail below with respect to FIGS. 3 to 7.

At step 240, the provisioned computing resources perform the operation on the examination data. At step 250, resulting data of the operation performed is transmitted to the computing device 110. This exchange of data may consist of moving the data associated with the request directly between the provisioned computing resources of the resource servers 160-1 to 160-4 and the computing device 110, without requiring that data first enter the cloud management system 170.

Figure 3:
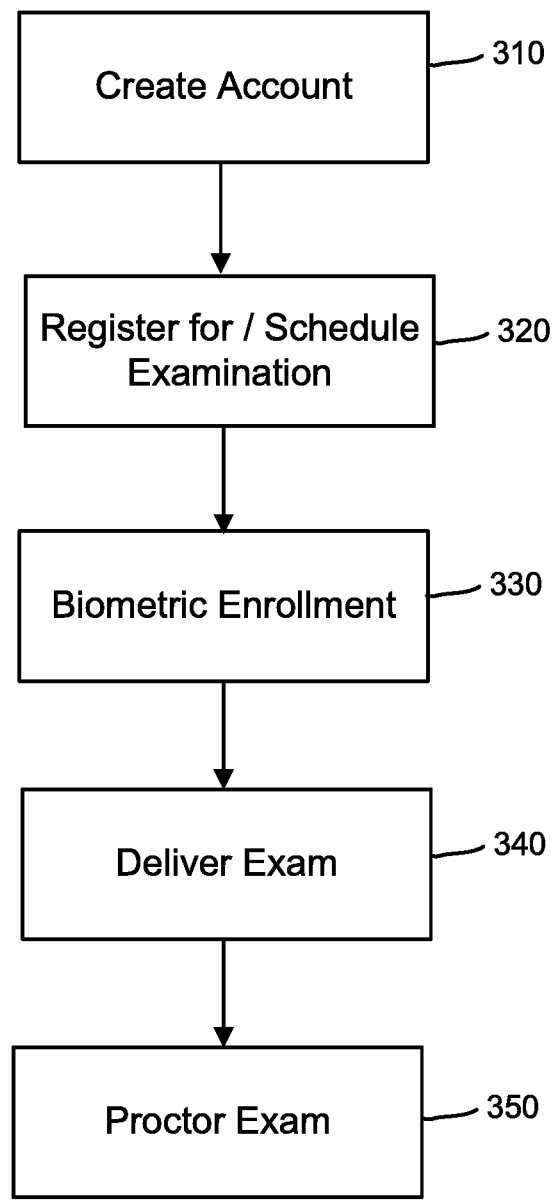
FIG. 3 illustrates a method for implementing an online proctored examination.

FIG. 3 illustrates a method for implementing an online proctored examination. In step 310, an account is created by a test taker. In step 320, an test taker registers for and/or schedules an examination. In step 340 the exam is delivered and proctoring commences at step 350. As described below, each of the aforementioned steps may be carried out utilizing provisioned computing resources of the cloud computer system 162.

Proctoring step 350 takes place over the course of the examination and may be implemented as part of step 340. The proctoring step 350 utilizes a variety of security technologies and processes to deter and detect aberrance during the exam process. In particular, the exam taking environment surrounding the test taker may be monitored in real-time by a proctor utilizing a live video feed of the test taker. The live video feed can be captured utilizing a video camera device or other visual and/or audio environment capture device as described above.

Figure 4:
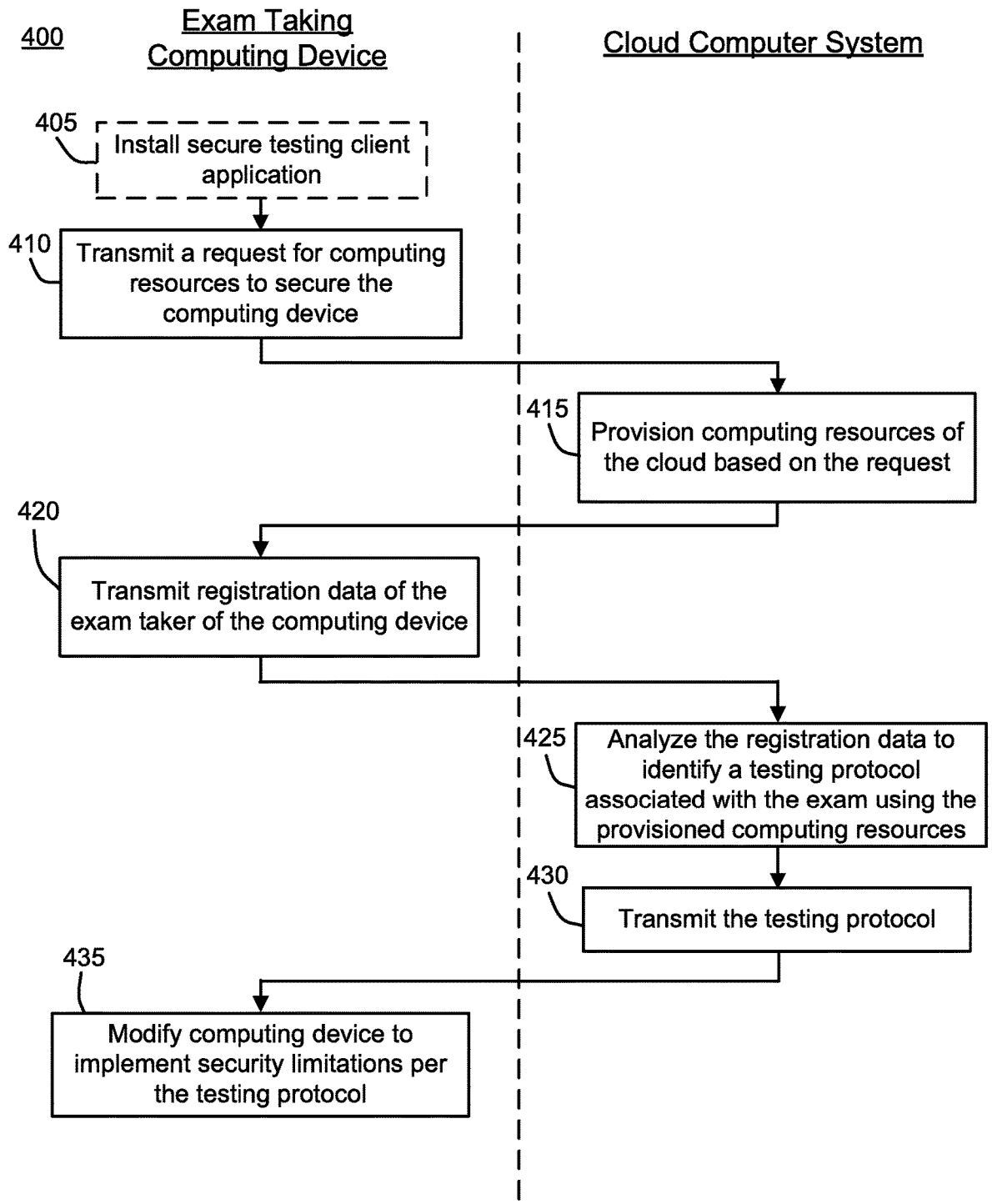
FIG. 4 illustrates a method for securing a computing device of a test taker using provisioned computing resources of the cloud computer system.

FIG. 4 illustrates a method 400 for securing the computing device 110 of a test taker using provisioned computing resources of the cloud computer system 162. At step 405, if the secure testing application 140 is not installed on the computing device 110, the secure testing application 140 is installed. Secure testing application 140 may be downloaded from the application server 174 or another computing device coupled to the communication network 150. Secure testing application 140 may also be installed from a computer-readable storage device such as a CD-ROM.

The need to acquire the secure testing application 140 may be previously communicated to the test taker or may be indicated when the test taker attempts to access the application server 174, but lacks the proper credentials to do so as the test taker has not been authenticated by the secure testing application 140.

At step 410, the computing device 110 transmits a request for computing resources to secure the computing device 110. The transmission of the request may be initiated automatically by the secure testing application 140 upon successful completion of the enrollment and authentication of the test taker.

At step 415, the application server 174 provisions computing resources of one or more of the resource servers 160-1 to 160-4 based on the request. At step 420, the computing device 110 transmits registration data of the test taker associated with the computing device 110. The registration data indicates identifying information of the test taker and/or the examination, such as a name or examination identification number. The registration data may alternatively be provided in step 410. As another example the registration data may have been provided by the test taker during registration or verification stages, which may for example be stored in the database server 172.

At step 425, the registration data is analyzed to identify a testing protocol associated with the exam. The testing protocol is related to the security of the testing event. Some protocols may be universal and pre-implemented in the secure testing application 140 such as requiring authentication of a test taker prior to commencing an examination. At step 430, the testing protocol is transmitted to the computing device 110.

At step 435, the testing protocols are implemented with respect to various hardware, software, and functional aspects of the computing device 110. Implementing the testing protocols may include modifying the system registry of the computing device 110 to prevent certain hardware, software, or other functionality from being implemented. These changes may be 'undone' once the once the secure testing application 140 completes its execution (i.e., the test is complete). As such, the secure testing application 140 may utilize the provisioned computing resources to maintain a record of changes it makes to the system registry to allow for proper editing back to an original setting. These records may also be maintained in order to allow the secure testing application 140 to make a determination whether any attempt to circumvent the testing protocols have been made.

Figure 5:
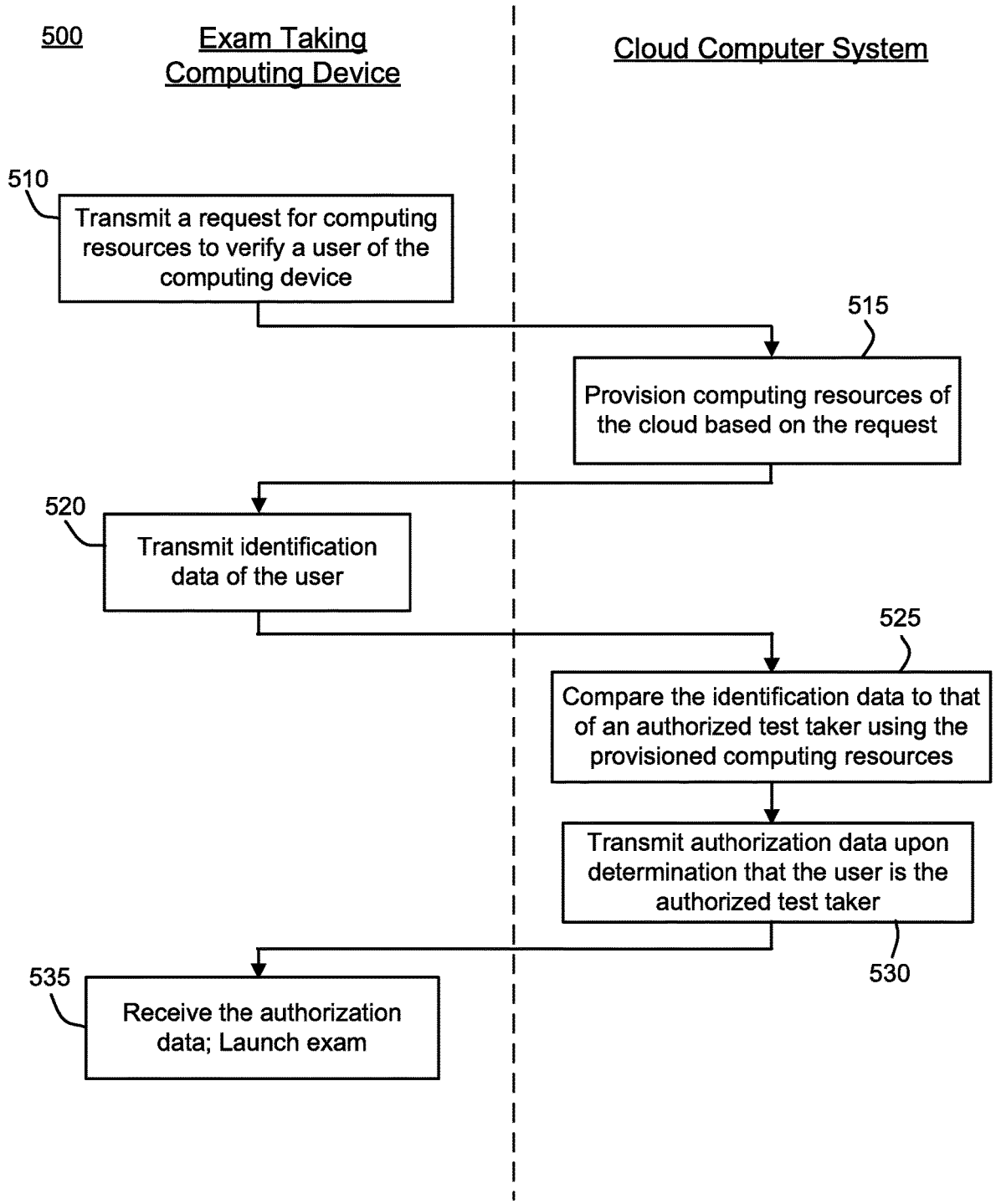
FIG. 5 illustrates a method for verifying a user of a computing device as an authorized test taker of the examination using provisioned computing resources of the cloud computer system.

FIG. 5 illustrates a method 500 for verifying a user of the computing device 110 as an authorized test taker of the examination using provisioned computing resources of the cloud computer system 162. At step 410, the computing device 110 transmits a request for computing resources to verify the user of the computing device 110. At step 515, the application server 174 provisions computing resources of one or more of the resource servers 160-1 to 160-4 based on the request.

At step 520, the computing device 110 transmits identification data of the user which can be used to verify the test taker identity. The identification data may be biometric information such as a visual image or voice print of the user captured through the user of video camera device 120, microphone 130, or other environment capture device. Retinal scans and finger prints, subject to the presence of the appropriate peripheral device, may also be provided for verifying test taker identity.

The identification data may also be generated by asking the user to provide a typing sample of a previously typed in phrase. Typing patterns of particular series of letters, numerals, and phrases are similar to fingerprints or other biometric information in that they are unique to a particular person. For example, a first test taker will exhibit specific nuances related to the entry of that series of letters, numerals, and phrases versus those of a second test taker. These nuances may include the speed at which the series of letters, numbers, and phrases are entered; pauses between certain letters, numbers, and phrases, and if a keyboard offers pressure sensitive detection, the intensity with which the user enters that information (e.g., how hard the test taker types).

At step 525, the identification data of the user is compared to verified identification data of an authorized test taker using the provisioned computing resources. This comparison depends on the details of the received identification data. For example, step 525 may compare a previously acquired photograph with a current photograph of the test taker, compare other biometric information, and/or compare information related to typing patterns with the previously input typing sample. The previously acquired identification data may be maintained at the database server 172 or some other computing device tasked with maintaining this information.

The current photograph may be examined through the use of facial recognition software that analyzes particular points on the face and body of the test taker to ensure an acceptable degree of commonality that ensures the identity of the test taker. If the previously acquired photograph and the real-time photograph are not consistent, a proctor may be alerted to take further action and to delay administration of the examination. Comparison of voice samples may occur in a fashion similar to that of comparison of photographs.

At step 530, if the identification data of the user is within an acceptable range of the verified identification data of an authorized test taker, authorization data is transmitted to computing device 110. The authorization data indicates that the computing device 110 is allowed to execute a testing routine for the examination. At step 535, the computing device 110 receives the authorization data and launches the exam.

Figure 6:
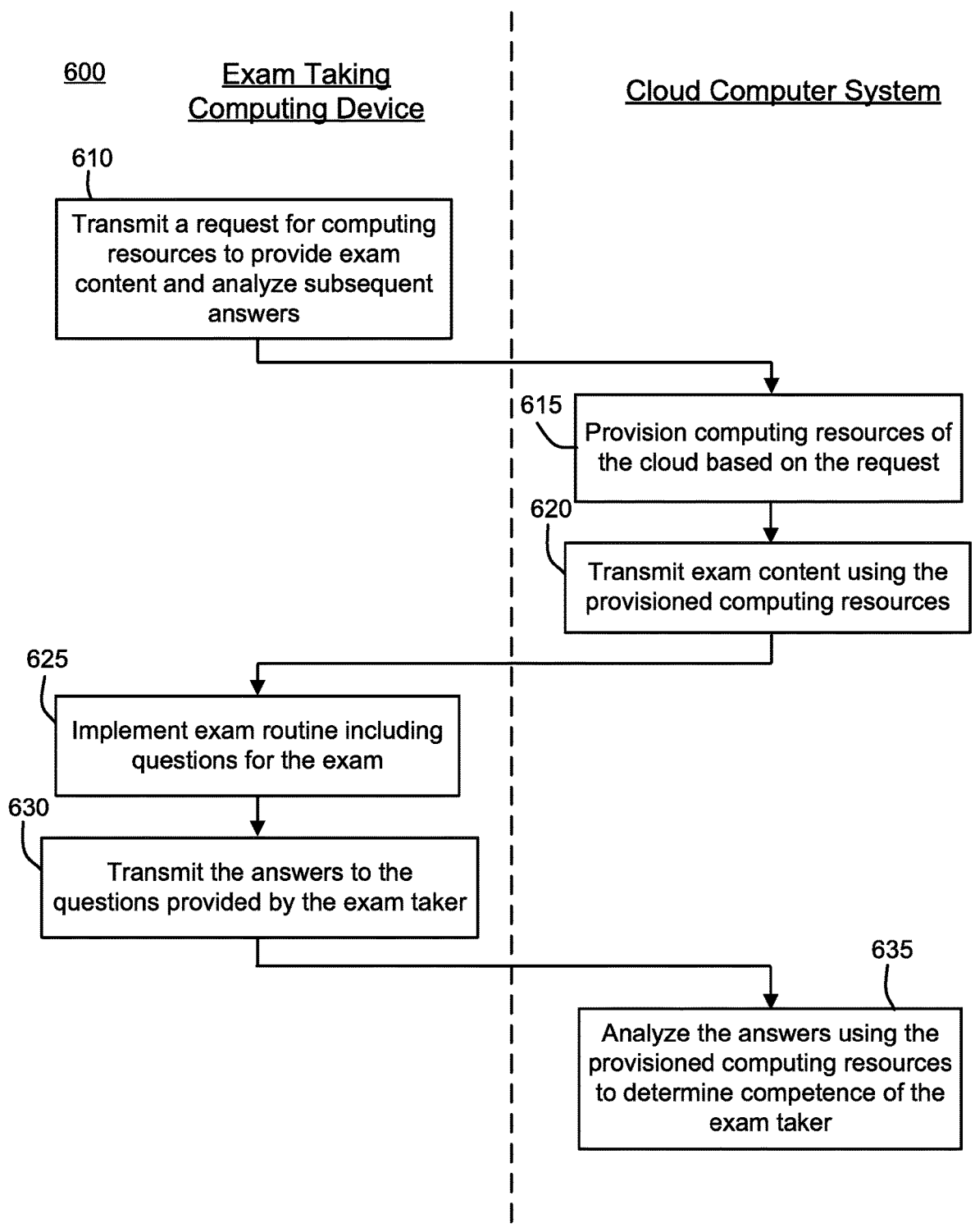
FIG. 6 illustrates a method for implementing an online examination using provisioned computing resources of the cloud computer system.

FIG. 6 illustrates a method 600 for implementing an online examination using provisioned computing resources of the cloud computer system 162.

At step 610, the computing device 110 transmits a request for computing resources to provide exam content and analyze subsequent answers provided by the test taker. At step 615, the application server 174 provisions computing resources of one or more of the resource servers 160-1 to 160-4 based on the request.

At step 620, the exam content including testing data such as the prompts and questions, or other data concerning the exam, is transmitted using the provisioned computing resources. At step 625, the computing device 110 implements the testing routine in accordance with the testing protocol and the exam content.

At step 630, the computing device 110 transmits data indicating the answers provided by the test taker during the testing routine. The computing device 110 may transmit the answers during the course of exam, or may transmit the answers upon completion of the exam.

At step 635, the answers are analyzed using the provisioned to computing resources to determine the competence of the test taker. The determination of the competence of the test taker may be based on the number of answers the test taker answered correctly. The number of correct answers corresponding to a particular 'score' for the test taker may be defined by the exam authority. As another example, the 'score' may simply indicate whether the test taker passed or failed the exam.

Figure 7:
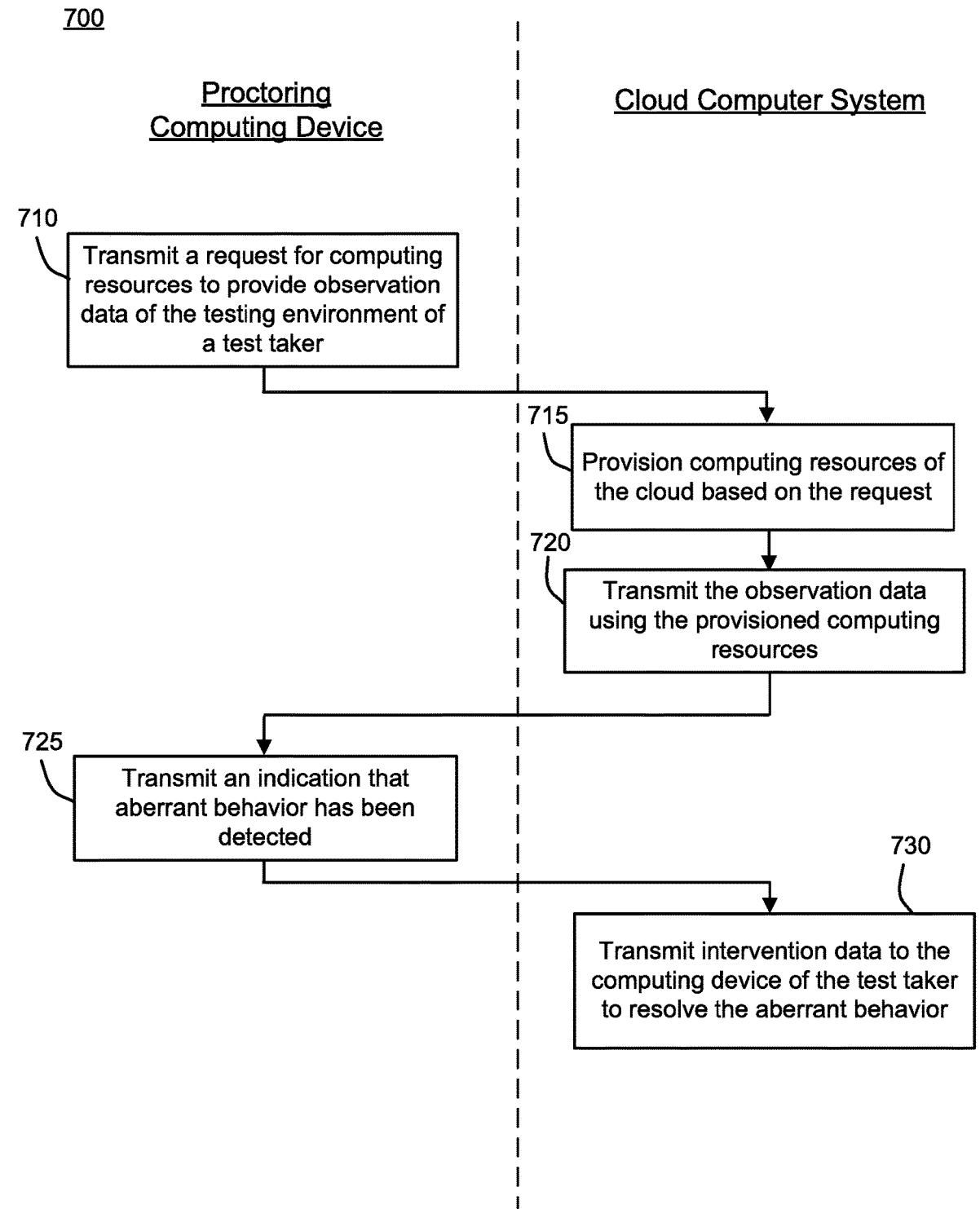
FIG. 7 illustrates a method for proctoring an online examination using provisioned computing resources of the cloud computer system.

FIG. 7 illustrates a method 700 for proctoring an online examination using provisioned computing resources of the cloud computer system 162. In step 710, a computing device associated with a proctor transmits a request for computing resources to provide observation data of the testing environment of a test taker. In this example, the request is transmitted by computing device 191 for the observation data of the test taker associated with computing device 110. In the illustrated embodiment, the request is for the real-time video data stream captured by the video camera device 120 and uploaded into the cloud computer system 162. The observation data may also or alternatively include other data that can be analyzed to detect aberrant behavior.

At step 720, the observation data is transmitted to the computing device 191 using the provisioned computing resources The data stream can then be displayed by the proctoring application 196 so that the proctor can monitor the examination environment surrounding the test taker in real-time to detect possible aberrant behavior.

Upon detection of aberrant behavior by the test taker, the proctor may intervene in the testing routine to resolve the aberrant behavior. The proctor may intervene by providing user input to the proctoring application 196 which then transmits an indication to the provisioned computing resources that aberrant behavior has been detected (step 725). Aberrant behavior may also or alternatively be automatically detected by the proctoring application 196 executing on the computing device 191, or by an application executing on the provisioned computing resources which analyzes the observation data.

In step 730, the provisioned computing resources transmit intervention data to the computing device 110 to intervene in the testing routine to resolve the aberrant behavior. For example, the provisioned computing resources may transmit a request to the computing device 110 that the testing routine for the examination is no longer allowed to continue. In some instances the aberrant behavior may simply be that the examination environment needs to be modified to ensure proper proctoring, which could include raising the light level or decreasing background noise (e.g., closing a window). In such a case, the intervention data transmitted by the provisioned computing resources is a request that the environment surrounding the computing device 110 be modified to resolve the aberrant behavior.

During the course of an examination, the proctor associated with the computing device 191 may be responsible for the simultaneous observation of a number of data streams of the examination environments surrounding different test takers. Upon detection of possible aberrant behavior by a particular test taker, the proctor may provide user input to the proctoring application 196 requesting that the data streams of the other test takers also be transmitted to the computing devices of one or more other proctors. The proctoring application 196 transmits this request to the application server 174. The application server 174 then determines which computing devices are available to receive the data streams of the other test takers, and provisions computing resources of the cloud computer system 162 to transmit the data streams of the other test takers. In doing so, the proctor can more closely analyze the possible aberrant behavior by the particular test taker, without allowing the other test takers to go unobserved.

The proctor may also request that the data stream of a test taker exhibiting possible aberrant behavior be transmitted to the computing device of another proctor or third party test assessment authority (e.g., a professor) for the purpose of validating or making an affirmative determination that the test taker in fact violated a testing protocol. Following a determination that a test taker violated a testing protocol, the proctor or other third party test assessment authority can then make a final or early decision regarding disciplinary action.

Computer-readable storage media refer to any non-transitory storage medium and that may allow for instructions to be provided to a central processing unit (CPU) for execution. Such media can take many forms, including, but not limited to, non-volatile and volatile media such as optical or magnetic disks and dynamic memory, respectively. Common forms computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASH EPROM, and any other memory chip or cartridge.

Computer-readable storage medium, which are non-transitory in nature, differ from the various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims.

What is claimed is:

1. A method for administration of an examination over a network, the method comprising:
    receiving a request over the network for a desired computing resources of a cloud computer system having a plurality of resource servers, the request received from a local computing device executing a routine for the examination;
    identifying an amount of supplemental computing resources based on the request from the local computing device to provision for the local computing device in order to administer the examination at the local computing device for the routine for the examination;
    identifying one or more of the resource servers in the plurality of resource servers having at least the identified amount of the supplemental computing resources available by analyzing a plurality of performance metrics of each of the resource servers;
    provisioning the identified resource servers to provide the identified amount of supplemental computing resources for use by the local computing device based on the request;
    dynamically adjusting the identified amount of supplemental computing resources provided from the resource servers to the local computing device, wherein the identified amount is adjusted automatically in response to detection of an amount of additional processing power and memory required to resolve aberrant behavior associated with a testing environment of a test taker and based on monitored changes in real-time performance of the identified resource servers;
    receiving examination data associated with the request;
    performing an operation on the received examination data using the provisioned computing resources; and
    transmitting resulting data of the operation performed on the examination data to the local computing device.

2. The method of claim 1, wherein the received request includes a request for computing resources to provide observation data of the testing environment of the local computing device.

3. The method of claim 2, further comprising provisioning computing resources for analyzing the observation data.

4. The method of claim 1, further comprising receiving a request from a proctoring device for the desired computing resources of the cloud computer system.

5. The method of claim 1, further comprising identifying that the received examination data is indicative of the aberrant behavior of the test taker.

6. The method of claim 5, further comprising provisioning resources to the local computing device to transmit intervention data to intervene testing routine to resolve the aberrant behavior of the test taker.

7. The method of claim 6, wherein the intervention data includes a request that the testing environment be modified to resolve the aberrant behavior of the test taker.

8. The method of claim 7, wherein the request that the testing environment be modified includes a request to modify lighting level of the testing environment.

9. The method of claim 7, wherein the request that the testing environment be modified includes a request to modify a background noise level of the testing environment.

10. The method of claim 1, further comprising:
receiving a request for examination data of other computing devices executing the routine for the examination;
determining computing devices that are available to receive the examination data of the other computing devices; and
provisioning computing resources of the cloud computer system to transmit the examination data of the other computing devices.

11. The method of claim 1, wherein the received examination data includes a visual capture of the testing environment surrounding the test taker.

12. The method of claim 1, wherein the received examination data includes an audio capture of the testing environment surrounding the test taker.

13. A system for dynamic administration of an examination over a network, the system comprising:
a local computing device for executing a routine for the examination; and
a cloud computer system having a plurality of resource servers that:
receives a request over the network for a desired computing resources, the request received from the local computing device executing a routine for the examination;
identifies an amount of supplemental computing resources based on the request from the local computing device to provision for the local computing device in order to administer the examination at the local computing device for the routine for the examination;
identifies one or more of the resource servers in the plurality of resource servers having at least the identified amount of the supplemental computing resources available by analyzing a plurality of performance metrics of each of the resource servers;
provisions the identified resource servers to provide the identified amount of supplemental computing resources for use by the local computing device based on the request;
dynamically adjusts the identified amount of supplemental computing resources provided from the resource servers to the local computing device, wherein the identified amount is adjusted automatically in response to detection of an amount of additional processing power and memory required to resolve aberrant behavior of a test taker and based on monitored changes in real-time performance of the identified resource servers, the aberrant behavior associated with a testing environment;
receives examination data associated with the request;
performs an operation on the received examination data using the provisioned computing resources; and
transmits resulting data of the operation performed on the examination data to the local computing device.

14. The system of claim 13, wherein the received request includes a request for computing resources to provide observation data of the testing environment of the local computing device.

15. The system of claim 14, wherein computing resources is provisioned for analyzing the observation data.

16. The system of claim 13, wherein the received request is from a proctoring device for the desired computing resources of the cloud computer system.

17. The system of claim 13, wherein the received examination data is indicative of the aberrant behavior of the test taker.

18. The system of claim 17, wherein computing resources are provisioned to the local computing device to transmit intervention data to intervene testing routine to resolve the aberrant behavior of the test taker.

19. The system of claim 18, wherein the intervention data includes a request that the testing environment be modified to resolve the aberrant behavior of the test taker.

20. The system of claim 19, wherein the request that the testing environment be modified includes a request to modify lighting level of the testing environment.

21. The system of claim 19, wherein the request that the testing environment be modified includes a request to modify a background noise level of the testing environment.

22. The system of claim 13, wherein the cloud computer system further:
receives a request for examination data of other computing devices executing the routine for the examination;
determines computing devices that are available to receive the examination data of the other computing devices; and
provisions computing resources of the cloud computer system to transmit the examination data of the other computing devices.

23. A non-transitory computer-readable storage medium, having embodied thereon a program, the program being executable by a processor to perform a method for dynamic administration of an examination over a network, the method comprising:
receiving a request over the network for a desired computing resources of a cloud computer system having a plurality of resource servers, the request received from a local computing device executing a routine for the examination;
identifying an amount of supplemental computing resources based on the request from the local computing device to provision for the local computing device in order to administer the examination at the local computing device for the routine for the examination;
identifying one or more of the resource servers in the plurality of resource servers having at least the identified amount of the supplemental computing resources available by analyzing a plurality of performance metrics of each of the resource servers;
provisioning the identified resource servers to provide the identified amount of supplemental computing resources for use by the local computing device based on the request;
dynamically adjusting the identified amount of supplemental computing resources provided from the resource servers to the local computing device, wherein the identified amount is adjusted automatically in response to detection of an amount of additional processing power and memory required to resolve aberrant behavior of a test taker and based on monitored changes in real-time performance of the identified resource servers, the aberrant behavior associated with a testing environment;
receiving examination data associated with the request;
performing an operation on the received examination data using the provisioned computing resources; and transmitting resulting data of the operation performed on the examination data to the local computing device.

* * * * *